(12) United States Patent
Chalmer et al.

(10) Patent No.: US 8,930,568 B1
(45) Date of Patent: Jan. 6, 2015

(54) METHOD AND APPARATUS FOR ENABLING ACCESS TO STORAGE

(75) Inventors: Steve Chalmer, Auburndale, MA (US); Steven T. McClure, Northboro, MA (US); Serge Pirotte, Coventry, RI (US); Velmurugan Rathnam, Shrewsbury, MA (US); Animesh Singh, Bangalore (IN); Hongliang Tang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 262 days.

(21) Appl. No.: 13/331,478

(22) Filed: Dec. 20, 2011

(51) Int. Cl.
*G06F 15/16* (2006.01)
*G06F 9/46* (2006.01)
*G06F 17/30* (2006.01)

(52) U.S. Cl.
USPC ............................ 709/232; 718/101; 707/705

(58) Field of Classification Search
None
See application file for complete search history.

(56) References Cited

U.S. PATENT DOCUMENTS

| | | | | |
|---|---|---|---|---|
| 5,873,089 | A * | 2/1999 | Regache | 1/1 |
| 7,111,086 | B1 * | 9/2006 | Ecoleston et al. | 710/33 |
| 7,447,854 | B1 * | 11/2008 | Cannon | 711/162 |
| 7,631,155 | B1 * | 12/2009 | Bono et al. | 711/156 |
| 7,818,535 | B1 * | 10/2010 | Bono et al. | 711/173 |
| 8,266,099 | B2 * | 9/2012 | Vaghani | 707/609 |
| 8,291,170 | B1 * | 10/2012 | Zhang et al. | 711/135 |
| 8,510,590 | B2 * | 8/2013 | Ji et al. | 714/3 |
| 8,566,502 | B2 * | 10/2013 | Vaghani | 711/6 |
| 2005/0018621 | A1 * | 1/2005 | Dropps et al. | 370/254 |
| 2006/0101226 | A1 * | 5/2006 | Benhase et al. | 711/203 |
| 2007/0130168 | A1 * | 6/2007 | Watanabe et al. | 707/10 |
| 2008/0184000 | A1 * | 7/2008 | Kawaguchi | 711/165 |
| 2009/0104954 | A1 * | 4/2009 | Weber et al. | 463/1 |
| 2009/0219569 | A1 * | 9/2009 | Hara | 358/1.15 |
| 2009/0300023 | A1 * | 12/2009 | Vaghani | 707/10 |
| 2009/0300301 | A1 * | 12/2009 | Vaghani | 711/162 |
| 2009/0300302 | A1 * | 12/2009 | Vaghani | 711/162 |
| 2009/0319256 | A1 * | 12/2009 | Chow et al. | 703/26 |
| 2009/0320009 | A1 * | 12/2009 | Chow et al. | 717/154 |
| 2010/0100695 | A1 * | 4/2010 | Sudo et al. | 711/162 |
| 2010/0186014 | A1 * | 7/2010 | Vaghani et al. | 718/101 |
| 2010/0218184 | A1 * | 8/2010 | Minematsu et al. | 718/1 |
| 2010/0325357 | A1 * | 12/2010 | Reddy et al. | 711/118 |

* cited by examiner

*Primary Examiner* — Brian P Whipple
*Assistant Examiner* — Michael A Chambers
(74) *Attorney, Agent, or Firm* — Anderson Gorecki & Rouille LLP

(57) ABSTRACT

When a guest OS loads within the context of a container provided by the host OS, the guest OS uses PCI or other protocol to specify a virtual hardware device. The guest OS enumerates the virtual hardware device to establish the size for the BARs and establish its view of physical addresses for the memory locations. A server running in the context of the container receives read/write requests from the guest OS, maps the read/write requests to host OS physical address space, and posts responses to the virtual hardware device. Since the guest OS executes memory related operations using its own memory space, exits to the container code are not required to implement storage related actions by the Guest OS. This allows performance of an application executing in the context of the guest OS to approximate performance of an application executing in the context of the host OS.

20 Claims, 7 Drawing Sheets

Figure 3

| UINT8 Offset | | vCTDring Device PCI Header | | | |
|---|---|---|---|---|---|
| dec | hex | Byte 3 | 2 | 1 | 0 |
| 00 | 0x00 | Device ID | | Vendor ID | |
| 04 | 0x04 | Status Register | | Command Register | |
| 08 | 0x08 | Class Code | | | Version ID |
| 12 | 0x0C | BIST | Header Tpe | Latency Timer | Cache Line Size |
| 16 | 0x10 | BAR0/1: Base Address and Size of Index and Control Page | | | |
| 20 | 0x14 | | | | |
| 24 | 0x18 | BAR2/3: Base Address and Size of Request Ring | | | |
| 28 | 0x1C | | | | |
| 32 | 0x20 | BAR2/3: Base Address and Size of Completion Ring | | | |
| 36 | 0x24 | | | | |
| 40 | 0x28 | Unused | | | |
| 44 | 0x2C | Unused | | Unused | |
| 48 | 0x30 | Expansion ROM Base Address (unused) | | | |
| 52 | 0x34 | Reserved | | Capabilities Ptr. | |
| 56 | 0x38 | Reserved | | | |
| 60 | 0x3C | Unused | Unused | Interrupt Pin | Interrupt Line |
| 64 | 0x40 | Message Control Register | | Next Capability | Capability ID |
| 68 | 0x44 | Message Address Register (LSB for 64-bit) | | | |
| 72 | 0x48 | Message Address Register (MSB for 64-bit) | | | |
| 76 | 0x4C | Unused (all 0s) | | Message Data Register | |

Fig. 5

CtdRequest_t

| | | |
|---|---|---|
| | rq_opaque | 500 |
| | rq_sglp | 510 |
| | rq_size | 520 |
| | rq_lun | 540 |
| rq_dcb_bytes 550 | rq_count | 560 |
| | rq_cdb | |
| | rq_sg[0] | 530 |
| | rq_sg[1] | 530 |
| | rq_sg[2] | 530 |
| | rq_sg[3] | 530 |

Fig. 6

CtdCompl_t

| | | |
|---|---|---|
| | cm_opaque | 600 |
| | cm_size | 610 |
| | cm_flags | 620 |
| cm_reserved | cm_sense_bytes 630 | cm_timestamps 650 |
| | cm_sense 640 | |

METHOD AND APPARATUS FOR ENABLING ACCESS TO STORAGE

CROSS REFERENCE TO RELATED APPLICATIONS

None

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to enabling access to storage on a computer system.

DESCRIPTION OF THE RELATED ART

A computer includes one or more central processing units and other hardware that together execute operations to allow the computer to process data. An operating system (OS) is a set of programs that manages computer hardware resources, and provides common services for application software. Many operating systems have been developed, including Unix, Linux, Windows, ESX1, and SymmK (EMC). Other system software may support the operating system to run particular portions of the computer hardware to help provide a platform for running the application software.

There are instances where it is desirable to have more than one operating system execute on the same computer hardware platform. Typically, this is implemented by loading one (host) operating system on the hardware platform, and then creating a container to provide a virtual hardware environment on which a guest operating system may execute. The container may be implemented, for example, as a thread in the host operating system. Application programs may then execute on the environment provided by the guest OS.

One problem that occurs in this environment is associated with memory management. Specifically, the container code runs in the context of the host operating system which has one memory management system and address space specified by the host operating system. The guest operating system, by contrast, has its own memory management scheme and addressing process that may be expected to be different than the memory management scheme of the host operating system. Accordingly, if the guest operating system needs to access memory (e.g. needs to write data to a disk drive under the control of the host OS), it is often necessary for the guest operating system to return to the container code to execute the memory access. A "VMexit" or virtual machine exit call is used to return to the container code. A similar problem may be encountered when two Guest Oss need to talk to each other.

Unfortunately, returning to the container code is slow. Specifically, all state information associated with the guest OS must be saved prior to returning to the container code. This takes a finite amount of time, which decreases performance of the applications running in the context of the guest OS. Accordingly, it would be advantageous to provide a way for a guest OS to access storage devices and otherwise transmit data without resorting to the container code to accelerate memory accesses by the guest OS.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

Data is able to be transferred into/out of a virtual hardware environment utilizing a virtual storage hardware device specified within the virtual hardware environment. The virtual hardware storage device enables physical memory resources, such as disk drives provided by a host computer, to be treated as directly attached disk drives to a guest operating system in the virtual hardware environment. According to an embodiment, when a guest OS loads within the context of a container provided by the host OS, the guest OS specifies a virtual hardware device in the form of a PCI HBA. Other protocols may be used to specify the hardware device within the virtual hardware environment as well. The guest OS enumerates the virtual hardware device during initialization, e.g. to establish the size for the BARs as it would any other PCI device and establish its view of physical addresses for the memory locations. A server running in the context of the container receives read/write requests from the guest OS, maps the read/write requests to host OS physical address space, and posts responses to the virtual hardware device. Since the guest OS executes memory related operations using its own memory space, exits to the container code are not required to implement storage related actions by the Guest OS, so that the performance of an application executing in the context of the guest OS is able to be on par with performance of an application executing in the context of the host OS. The driver maps memory related operations to the guest OS memory space to implement storage related actions on the hardware under the control of the host OS on behalf of the guest OS. Similar operations may be able to implement data transfers between virtual hardware environments as well as between a virtual hardware environment and a physical hardware environment.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3 is an example PCI header specified to implement the virtual hardware device by the guest OS;

FIG. 5 is an example memory access request used by the virtual hardware device;

FIG. 6 is an example memory response used by the virtual hardware device;

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
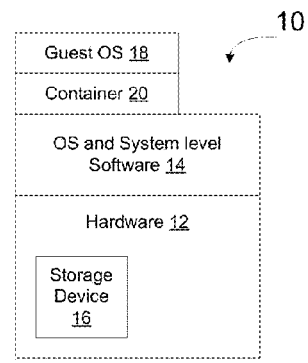
FIG. 1 is a functional block diagram of a network storage system.

FIG. 1 is a high-level functional block diagram of a network storage system 10. As shown in FIG. 1, the network storage system includes hardware 12, the operation of which is controlled by operating system and system level software 14. In one embodiment, software 14 is implemented as a high performance, embedded software stack. The embedded software stack, as a whole, runs directly on the hardware and handles and allocates all hardware interfaces and memory to the various hardware subsystems. At the base of the software stack is an embedded, real-time operating system, which includes process/thread scheduling, device drivers and memory management tailored specifically to the needs of the network storage system software.

In one embodiment, the OS/system level storage may be implemented using Enginuity™ EMC Corp., although other hardware platforms and software environments may be used as well. Although an embodiment will be described in connection with this EMC network storage system, the invention is not limited to this environment and may equally be implemented in other network storage systems. Storage devices 16, either directly attached or available via a storage area network, are managed by the network storage system.

There are times where it would be advantageous to allow a Guest Operating System (OS) 16 to run on the network storage system 10. This is conventionally implemented by creating a container 18 which provides a virtual hardware environment for the guest OS. In particular, the container provides memory to the guest OS and is run as a thread in the Host OS and scheduled by the host OS.

Since the Guest OS is running in the virtual environment provided by the container, it is sometimes necessary for the Guest OS to cease execution to return to the container code. This is commonly referred to as a Virtual Machine exit (VMexit). When this occurs, the guest context is required to be saved so that the guest OS may resume where it left off when control is returned from the container. Saving the guest context takes a finite amount of time. Unfortunately, memory access operations, such as writing/reading data to one of the storage devices 16 conventionally required a VMexit to enable the container code to specify to the Host OS how to handle the memory access operation.

According to an embodiment, a driver is provided that will allow a Guest OS to use the network storage system devices 16 as "native" disks. That is, the Guest OS will be able to treat a network storage system device (or multiple network storage system devices) as if they were directly attached disk drives. Since a VMexit is not required to enable access to the network storage system devices, the driver provides performance equal or superior to that which could be obtained if the Guest OS were directly attached to the equivalent hardware itself.

In the following description, an embodiment will be described in which a driver enables a virtual PCI device to be established. The invention is not limited to this particular embodiment, as other techniques may be used to establish virtual devices to allow components of a system to exchange information. For example, in the embodiment described below PCI is used to establish the memory allocations for the virtual device. Other protocols may be used to establish memory allocations for the virtual device and the use of PCI is simply one embodiment. Likewise, in the described embodiment the virtual device is used to enable a guest OS to access memory resources of an underlying hardware infrastructure. Similar techniques may be used to allow memory-to-memory communications among clustered guests on different boards implemented on the underlying hardware infrastructure where the guests are not accessing storage at all. Accordingly, the use of the virtual storage device described herein to enable a guest OS running in a virtual hardware environment to access resources of an underlying physical hardware environment is merely one embodiment.

In one embodiment the driver runs in a virtual environment on the Guest OS, such as being compiled into the Guest OS, loaded at run-time, or otherwise provided according to the necessities of the Guest. The driver enables the network storage system device 16 to appear as a simple block storage medium, as a complete SCSI disk drive, a simple serial device or as other any devices which the Guest OS is configured to use for storage operations.

Figure 2:
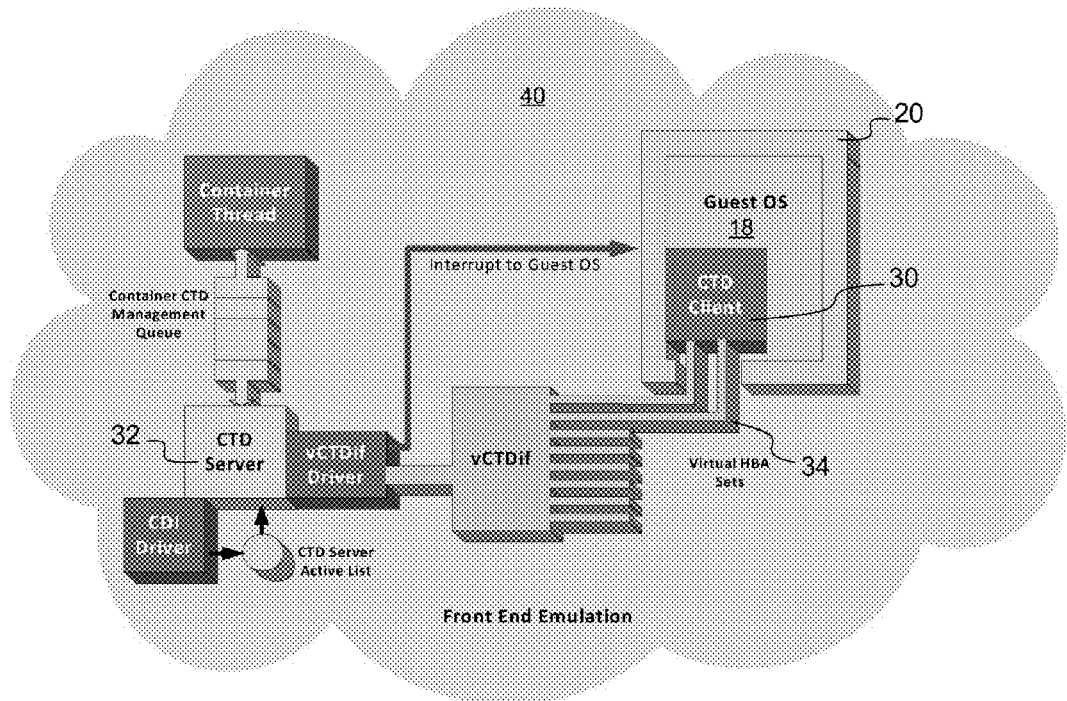
FIG. 2 is a functional block diagram of a virtual hardware device enabling a guest OS to access storage resources of the network storage system.

FIG. 2 shows a functional block diagram of an example system that enables a guest OS to access system devices 16 available on network storage system 10. As shown in FIG. 2, the guest OS 18 is running in the context of container 20 which provides a virtual hardware environment for the guest OS. A Cut-Through Driver (CTD) is implemented, in this embodiment, as client/server, in which the client side 30 is considered the Guest OS driver. The server side 32 is an OS and System level software 14 driver running as part of the container thread's managed subsystem (although the driver may be running in the context of a different thread than the Container itself).

To enable the network storage system to support different types of Guest Operating Systems, preferably the Cut-through driver server side 32 should be configured to support clients running in any hosted Guest OS without requiring OS specific modifications.

Since the server is operating in the context of the network storage system 10, the server driver will have access to any storage device 16 that has been mapped in the normal manner to any network storage system front-end host port, as long as that host port has been setup to allow access from the Guest OS as a valid host. This means that the server driver 32 will need to support both intra-board and inter-board communications.

Since the client driver is set up by the Guest OS, the client driver will support the same size drives that the Guest OS supports, as long as that characteristic of the devices specified by the Guest OS are able to be provided by the storage devices 16 on the server side.

On the client Guest OS facing side, the Cut-through driver may present an interface equivalent to a SCSI Host Bus Adapter (HBA). In one embodiment, PCI may be used to set up the memory at the Guest OS, although other protocols may be used to set up these parameters as well. The specifics of this interface are set forth in greater detail below. On the Container/GuestOS interface side, the client and server communicate using the Cut-through driver protocol described in greater detail below.

On the server side, the Cut-through driver will present the network storage system facing side with an interface that allows the server to read and write data to the storage devices 16 in such a manner that those devices may also be mapped and used by the Guest OS as normal front-end ports.

Installation of the client side driver conforms to the requirements of the specific Guest OS. If it is possible for the Guest OS to load and unload drivers at run time, the client side driver must be supplied to the Guest in a manner that allows this. That is, the client side driver may be available as part of a file system that is readable by the Guest, or it may be included in the Guest loadable image, or it may be compiled into the Guest.

If the client side driver is loadable by the Guest at run-time, the Guest must not need to use the client side driver in order to obtain access to the driver's loadable image. This means that for such a feature to be supported there is a constraint to provide some storage access method to the Guest OS other than the client side driver.

For those Guest OS images that need to include the client side driver (e.g. ESXi device, initrd files, compiled in modules, etc.), the client side driver should be supplied in a manner consistent with the requirements of the specific Guest OS. That may include compiled, loadable modules (e.g., Linux ".ko" types, Windows install packages for DLLs, etc.).

In one embodiment, the client/server model used for the Cut-through driver includes a virtual PCI device (vCTDring) that presents an interface to a set of producer/consumer queues and memory buffers. The PCI device "registers" actual queue structures and the memory buffer are in memory that can be accessed by both the Container thread and the Guest OS virtual machine. Since the cut-through driver accesses memory without resorting to the container thread, the Cut-through driver performance is on par with the performance of an equivalent host connected to the equivalent storage device 16, e.g. using a normal Fiber Channel (FC) mediated host port on the network storage system 10.

As shown in FIG. 2, the Cut Through Device (CTD) Client 30 uses two of eight virtual Host Bus Adapter (HBA) devices 34 available from the vCTDring device 40. In FIG. 2, the Guest OS CTD Client 30 is shown connected to two different virtual HBA devices 34. Each virtual HBA 34 of the set contains a request ring and a completion ring. The use of producer/consumer indices allows lockless access from each side. The request ring is used for commands going from the client to the server. The completion ring is used for completion status events going from the server to the client. Optionally, a shared memory pool may be used to hold the request and completion message rings associated with the protocol messages being passed through the queues to allow zero-copy operations for messaging to be mediated via the Cut-through driver.

Note that there may be multiple request and completion ring pairs associated with a client. A server may service many such clients. The server makes no distinction as to the origins of the client queues. In particular, the server is able to serve up to some maximum number of connections. Those connections may be from the same Guest OS, or they may be from different Guest OS instances. In addition (as noted below), those clients may be from different instances or even resident on other boards. From the Client's point-of-view, each vHBA device may be used for a different application, or may be used to connect to more drives than the Guest's driver would allow from one interface. The actual use cases are entirely up to the Guest.

The Cut-through driver server side is required to respond to the transactions posted by the client in a timely manner. One way to do this is to have a thread spawned by the Container that polls the request queue and responds to the requests via the response queue. It is this server thread that supplies the storage device access.

Note that it would be very advantageous for the server thread to run concurrently with the Container thread, rather than consecutively. In a Simultaneous Multi-Processor (SMP) this may be accomplished by assigning the Container thread and the server thread to separate core affinities. In a non-SMP environment, the Container thread and the server thread actually run in different instances on two separate cores, although this may require extra management from the Cut-through driver sub-system which is not discussed herein in greater detail. In either of these methods, unnecessary vmexit penalties are minimized.

It is expected that the Fiber Adapters (FAs) presenting the storage devices 16 to the Cut-through driver are resident on the same board (and within the same local physical memory domain). This provides the best performance path to the data. However, it is certainly possible to extend the request and completion rings to accommodate channels from a Guest on one director board to a server thread on another director board. As long as the server thread is able to service the request and completion rings using the Cut-through driver protocol, the server thread is agnostic as to the location of the clients at the other ends.

As a side note, this means that the Cut-through driver protocol is equally agnostic as to whether the clients are actually running in a Guest OS, or are simply running as clients within the OS and system level hardware 14. Thus, although an embodiment has been described in which the cut-through driver client is running in a Guest OS, the cut-through driver may also run in other environments as well and is not limited to running in a Guest OS.

Also note that this is not a constraint on the locations of the network storage system devices themselves that may be used by the Guest OS. Those devices are simply treated as any other storage devices in the system. They may be serviced by Disk Adapters (Das) resident on the same board as the FA hosting the Guest's Container, or they may be on other boards. This is transparent to the Guest, and is simply a matter of how the storage device has been configured and mapped.

As noted above, the client and server implement the virtual storage device using a protocol (referred to herein as a Cut-Through Driver (CTD) protocol) which allows the client to post data access requests and allows the server to retrieve the data access requests and post responses. In one embodiment, the Cut-through Driver protocol is built around three data structures, referred to herein as the CtdSGLEntry_t, the CtdRequest_t and the CtdCompl_t data structures. These data structures are set forth below:

```
typedef struct_ctd_sgl_entry {
    UINT64 io_data;
    UINT32 io_size;
    UINT32 io_flags;
} CtdSGLEntry_t;
/* CtfSGLEntry_t.io_flags values: */
#define CTDSGLE_DATA 0
#define CTDSGLE_CDB (1<<0)
/* Cut-through Driver I/O Request Structure */typedef
struct_ctd_request {
    UINT64 rq_opaque;
```

```
    UINT64 rq_sglp;
    UINT64 rq_size;
    UINT8 rq_lun[4];
    UINT16 rq_count;
    UINT16 rq_cdb_bytes;
    UINT8 rq_cdb[32];
    CtdSGLEntry_t rq_sgl[4];
} CtdRequest_t;
/* The Cut-through Driver completion message: */
typedef struct_ctd_compl {
    UINT64 cm_opaque;
    UINT64 cm_size;
    UINT32 cm_flags;
    UINT8 cm_sense_bytes;
    UINT8 cm_timestamps;
    UINT8 cm_reserved[2];
    UINT8 cm_sense[104];
} CtdCompl_t;
/* CtdCompl_t.cm_flags values: */
#define CTDCM_FAILED  (1<<0)
#define CTDCM_SENSE   (1<<1)
#define CTDCM_TIMEOUT (1<<2)
```

The CTD Client transforms requests from the Guest applications into a form that fits the CtdRequest_t structure. The CTD Client will initialize CtdRequest_t.rq_sglp field (if needed) and the CtdSGLEntry_t fields with Guest physical addresses corresponding to those buffers. The CTD Server maps those addresses to the host physical space before accessing them. The CTD Protocol Structures are explained in greater detail below.

Communications between the CTD Server and CTD Client occur through the vCTDring device. This is a virtual hardware device that is a form of PCI HBA. There may be multiple virtual HBAs represented using the vCTDring device. FIG. 3 shows an example PCI register layout for this virtual device. When the Container subsystem starts, the vCTDring Device is "loaded". The Guest OS will enumerate the vCTDring device as part of the PCI initialization it performs on boot-up.

The Container will trap any Guest writes to this space. This allows the Container to establish the sizes for the Base Address Registers (BARs) in the normal manner of PCI devices, and allows the Guest to set its idea of the physical addresses for those spaces. The Container always knows how to translate Guest physical to network storage system physical addresses.

In one embodiment, the vCTDring device is a virtual PCI device. Any Guest OS that is capable of complying with the PCI standard may create a PCI device through which the Guest OS may then write and read data. The vCTDring device may be created as a normal PCI device by the Guest OS. FIG. 3 shows an example vCTDring Device PCI register layout. In FIG. 3, the device ID and vendor ID are assigned by the vender. The BAR0/1 field 300 defines the guest physical address of the 4K page containing the request and response indices. BAR2/3 specifies the Guest Physical address of the request ring, and BAR4/5 specifies the Guest Physical address of the completion ring.

The device header, as shown in FIG. 3, exists on a 4K aligned 4K page allocated and pinned into server logical memory by the vCTDring device driver when that driver is initialized. In addition, the Container API set for vPCI devices will reserve and map a set of 4K aligned 4K pages to be used as backing store for the CTD client BARs. The size of BAR1/2 is 4K, and is used to hold the request and response array indices. The sizes of BAR2/3 and BAR4/5 are determined as part of the vCTD ring device specification.

During the BIOS phase of the Guest initialization sequence (either at boot time or at some future hot-plug event of the vCTDring device), the guest will obtain the sizes of the BARs through the normal "write all Fs/read back mask" procedure. This access by the Guest to the PCI config space will generate a vmexit, and the vCTDring device function registered with the container will be invoked to allow it to provide the value of the mask being requested. The subsequent write-back of the Guest's physical memory that it assigns to the BAR will also generate a vmexit. The vCTDring device must check this for improper values in the lower bits, but can otherwise ignore this access.

The Container always has visibility into the memory of the Guest. Thus, the Guest's location of the memory used for the Request and Response Queue index registers as well as for the Request and Response Queue Arrays, is entirely up to the Guest. The actual number of entries on these queues is a function of the size set by the mask returned by the vCTDring virtual device in response to the Guest's BAR initialization. Since both the CtdRequest_t and CtdCompl_t types are powers of 2 in size, an integer number of these structures will fit into any size BAR. BARs should always be 4K aligned for maximum efficiency.

Figure 4:
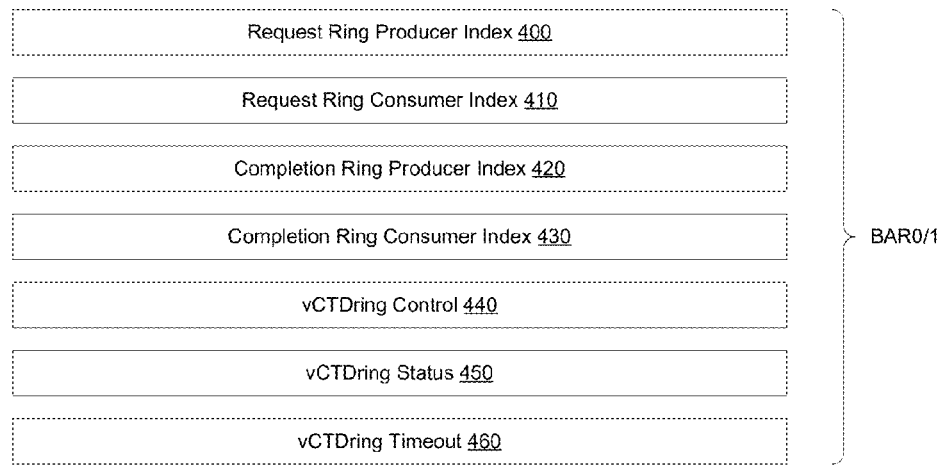
FIG. 4 is a functional block diagram of BAR0/1 of the PCI header of FIG. 3.

BAR0/1 always points to the base address of a contiguous 4K byte memory area (4K aligned). FIG. 4 shows one example BAR0/1 memory structure. As shown in FIG. 4, BAR0/1 holds the Request Producer index 400, Request Consumer index 410, the Response Producer index 420 and Response Consumer index 430, a vCTDring Control register 440, and vCTDring Status register 450. The BAR0/1 also includes a vCTDring timeout register 460. For cache-line efficiency, each of the fields of BAR0/1 may be aligned to start on 128 byte boundaries. The Producer index and the Consumer index for each queue are initialized to 0 when the vCTDring device is initialized. The vCTDring Control, Status and Timeout registers are also set to 0 on initialization.

BAR2/3 always points to the base address of the Request Queue Array, while BAR4/5 always points to the base address of the Response Queue Array. For these two arrays, the Server always maps the entire memory space, so that subsequent access by the Client will not generate a vmexit.

Note that because of the lockless nature of these queues, the Client must maintain its own state for any CtdRequest_t structure metadata. This may be done by the Client copying the relevant data fields for the CDB from other locations. It can use the CtdRequest_t.rq_opaque field to refer to that location. That field is passed back with the CtdCompl_t structure. Furthermore, the Server copies the CtdRequest_t structure and its associated CtdSGLEntry_t structures into its own space before advancing the Request Consumer Index register. As a consequence, as soon as the Server has dequeued the request, it no longer has any claim to the actual CtdRequest_t or CtdSGLEntry_t structures in the Client's space.

The same is true of the Response Queue Array. Consequently, the Client must not dequeue (that is, increment the Response Consumer Index register) until after it has reconciled the completion flags with the associated request.

The server can access any of the memory spaces pointed to by BAR0/1, BAR2/3 and BAR4/5 simply by reading and writing to them, since the server and the container are in the same logical space. Client access to any of the memory spaces referred to by BAR0/1, BAR2/3 and BAR4/5 will never cause vmexits. If the client wants to have synchronous responses, it must invoke the vmcall function.

Client access to the PCI config space (where the registers are located) will cause vmexits. This allows the vCTDring Device to behave in the same way as a hardware PCI device.

The vCTDring Control 440 contains bits that the client can use to control the behavior of the Server. Each of these has a corresponding handshake bit in vCTDring Status 450. The client sets (or resets) a bit in control and must wait for the server to set (or reset) the corresponding bit in Status before the client can make any changes. For example, the client may set a bit to cause the server to stop dequeuing requests or to start dequeueing requests again. When this bit is set (or reset) the server will acknowledge the control bit using a status bit, which indicates to the client that the server has stopped dequeueing requests or has started dequeueing requests again. Other bits may be used to control operation of the server by the client as well.

The vCTDring timeout 460 is a timeout value in milliseconds for each request, starting from the time that it is dequeued by the server. The client may modify this value at any time, but the new value will only modify requests that have not yet been dequeued.

In normal use, the server will poll for requests by reading the values of the request producer index 400 and request consumer index 410 fields. If these differ, the server will add the value of the Request Producer Index to its own logical address for the base of the request ring, and use the sum as the server logical pointer to the next CtdRequest_t structure. The server will copy this structure into another location in its own memory space, then increment the value of the Request Consumer Index 410. This indicates to the client that the space used by the specific request structure in the request ring is available again. Additionally, the server will at some point translate its copy of the request from guest physical memory space to server physical memory space. Likewise it will copy and translate each of the data fields contained in the request.

When the server has a completion to report, it obtains the address of the next available CtdCompl_t structure in the completion ring and fills it in. The server then increments the completion producer index field 420 to indicate to the client that the request has been completed.

FIG. 5 shows an example CTD Request data object, and FIG. 6 shows a CTD Completion data object. As shown in FIG. 5, the request includes an identifier field (rq_opaque) 500 which identifies the request. When the server creates a response, this field is copied to the completion (cm_opaque) 600 to enable the client to track which response belongs to which request. Since the responses are able to be correlated to the requests using this identifier, the server is not required to place responses into the completion_queue in the same order that the Client placed requests into the request_queue. This freedom allows the Server to choose how to carry out the requests in the most efficient manner.

The CtdRequest_t.sq_sglp field 510 is used only if the number of Scatter Gather List (SGL) entries is greater than the number of CtdSGLEntry_t structures available in the CtdRequest_t structure itself. The number available depends on the size of the CDB for this request, as indicated by the value of the rq_cdb_bytes field 520. If this is less than or equal to 32, then there are 4 CtdSGLEntry_t structures available. If rq_cdb_bytes is greater than 32, then rq_sgl[0].io_data 530 is used to point to the CDB, and there are only 3 remaining CtdSGLEntry_t structures 530 available (sg[1], sg[2], sg[3]).

If the number of SGL entries exceeds the number available, then the rq_sglp field 510 holds a Guest Physical pointer to a homogeneous array of CtdSGEntry_t structures. In that case, if the size of the CDB is greater than 32, the first entry in the SGL array pointed to by rq_sglp (that is, rq_sglp[0]) will be the reference to the CDB, and the actual SGLs will start with rq_sglp[1]. If rq_sglp is not used, it must be set to 0.

The CtdRequest_t.rq_size field 520 is the total size of the data being transferred, in bytes. (Note that this never includes the CtdSGLEntry_t.io_size field of an entry that is referring to a CDB that is greater than 32 bytes in size.)

The CtdRequest_t.sq_lun field 540 is used to hold the Logical Unit Number (LUN) that is the target of this request. All four bytes in this field are relevant.

The CtdRequest_t.sq_count field 550 is the number of CtdSGLEntry_t structures associated with this specific CDB. This count never includes a possible CtdSGLEntry_t structure that is referring to a CDB that is greater than 32 bytes in size.

The CtdRequest_t.rq_cdb_bytes field 560 is the number of valid bytes used in the CtdRequest_t.rq_cdb field. If this number is greater than 32, then the rq_cdb field is ignored, and the actual CDB is located in the memory pointed to by a CtdSGLEntry_t.io_data structure field, and has the size in the CtdSGLEntry_t.io_size field.

The CtdRequest_t.sq_sgl[0] through CtdRequest_t.sq_sgl[3] fields are used to hold the first 4 SGL entries associated with the CDB. Any unused fields are ignored (and should be set to all 0s). Note that rq_sgl[0] may refer to a CDB rather than to user data, if the size of the CDB is greater than 32 bytes. In that case, rq_sgl[1] becomes the first available SGL entry. The use of any of the rq_sgl[n] fields is constrained further by the number of SGL entries that are required for the CDB.

Figure 7:
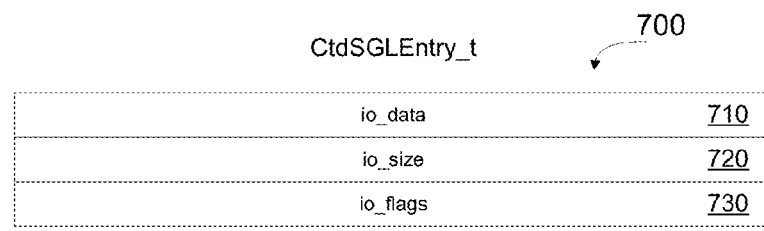
FIG. 7 shows an example cut through driver data entry data object.

FIG. 7 shows an example CTDSGLEntry_t Fields data object 700. As shown in FIG. 7, the data structure includes an io_data field 710, an io_size field 720, and an io_flags field 730.

The CtdSGLEntry_t.io_data field is either: the Guest physical pointer to the data being transferred (io_flags==CTDSGLE_DATA); or the Guest physical pointer to a CDB greater than 32 bytes in length (io_flags==CTDSGLE_CDB).

The CtdSGLEntry_t.io_size field is the size in bytes of the data being pointed to by the io_data field. If (io_flags==CTDSGLE_CDB), then this field is equal to CtdRequest_t.rq_cdb_bytes.

The CtdSGLEntry_t.io_flags field contains individual bits that may provide information to the CTD Server about the nature of this specific data. If (io_flags==CTDSGLE_DATA), then the io_size field is included in the total transfer size for this array. If (io_flags==CTDSGLE_CDB), then the this specific sgl entry is excluded from the total size calculation in CtdRequest_t.rq_size.

FIG. 6 shows a completion data structure which may be used by the server to post a response to the client. In the embodiment shown in FIG. 6, the CtdCompl_t.cm_opaque field 600 is always identical to the CtdRequest_t.sq_opaque field 500 of the associated request. The CTD Server will never modify this value in any manner. This allows the CTD Client to use this field as a pointer to its internal meta-data, for example, so that it becomes very simple to track responses to specific requests.

The CtdCompl_t.cm_size field 610 is filled in by the CTD Server with the number of bytes that were actually transferred in response to the associated CtdRequest_t structure. This value may differ from the CtdRequest_t.sq_size field 520. The CTD Server will always set the CTDCM_FAILED flag in the cm_flags field 620 if the cm_size value does not match the CtdRequest_t.rq_size field value when the transfer is complete. However, the reaction of the CTD Client in this case is entirely up to that specific Client's discretion.

The CtdCompl_t.cm_flags field contains bits that indicate the status of the associated CtdRequest_t structure (as indicated by the value of the cm_opaque field). In one embodiment, the flags field may include a bit to indicate if the request failed for some reason, a bit which may be set if the request was not completed before the associated request's timeout value was exceeded, and a bit that may be set if only one sense byte is being returned.

The CtdCompl_t.cm_sense_bytes field 630 is set with the number of valid bytes in the cm_sense field 640 if the CTDCM_SENSE bit is set in cm_flags. If this field is not used, it should be ignored.

The CtdCompl_t.cm_timestamps field 650 is set with the number of valid UINT64 timestamps that are present in the cm_sense field if the CTDCM_SENSE flag is 0. These timestamps are indexed according to events that are defined in the Server, and may be safely ignored by the Client under normal circumstances. They are useful for diagnosing performance, however, and it may be advantageous for the Client to have a provision to log these along with the Vendor ID, Device ID and Revision ID from the vCTDring Device.

The CtdCompl_t.cm_sense field 640 is used to hold data that is sent back to the Client by the network storage system. Under normal conditions, the CTDCM_SENSE flag will be 0, the cm_timestamps field will have a non-0 number, and the cm_sense field will hold that number of timestamps as an array of UINT64s. In the event of certain types of errors, the CTDCM_SENSE bit in the cm_flags field will be set to 1, the cm_sense_bytes field will hold the number of bytes in the cm_sense field that are valid. In either case, unused bytes in the cm_sense field should be ignored.

Figure 8:
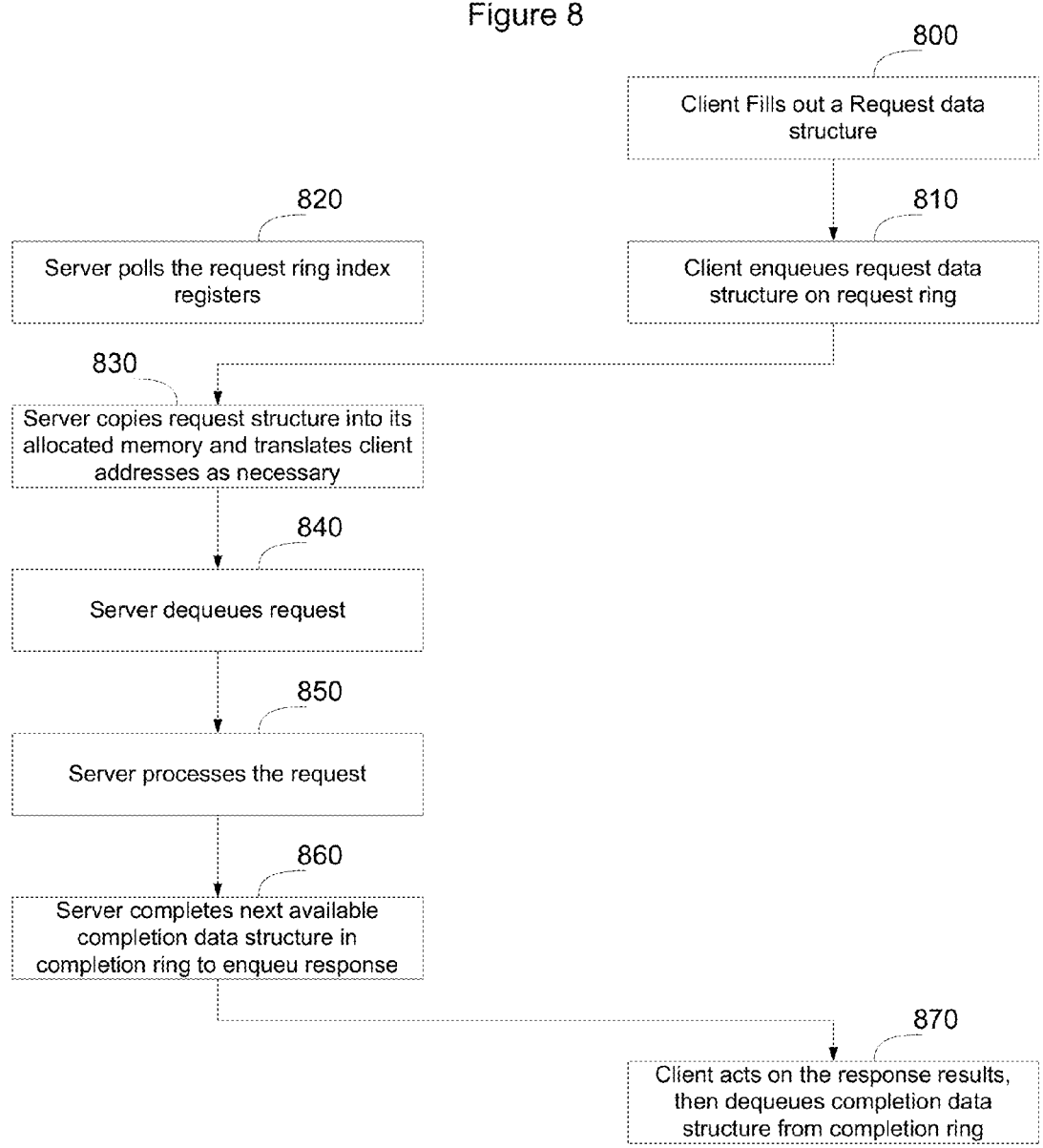
FIG. 8 is a flow chart showing a request/response flow between components of the virtual hardware device.
Figure 9:
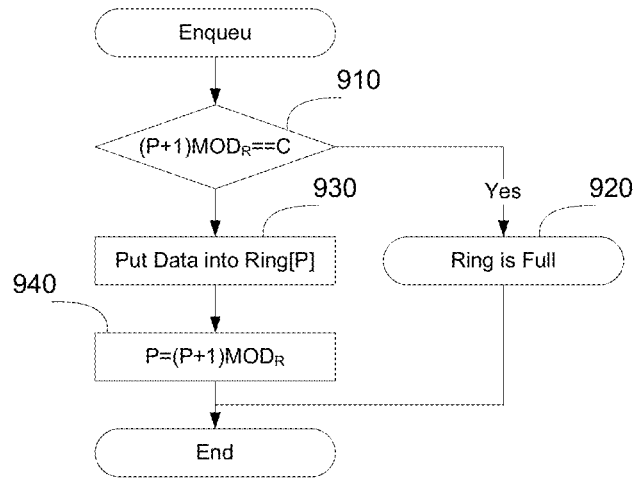
FIGS. 9 and 10 are flow charts showing example enqueue and dequeue operations of the virtual hardware device.
Figure 10:
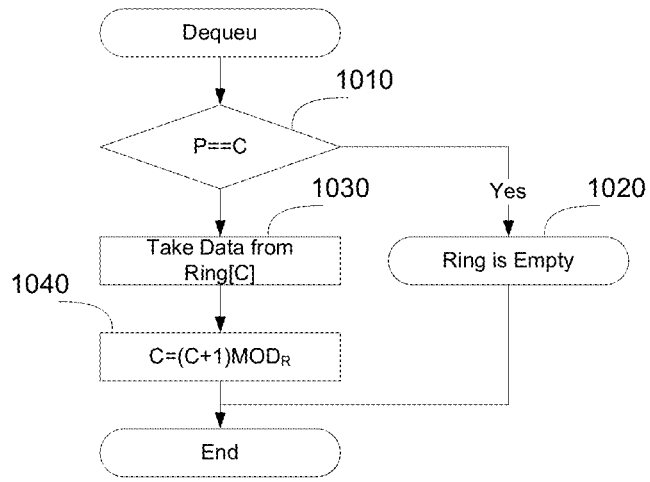

FIG. 8 shows an example Request/Response flow between the CTD client and CTD Server. FIGS. 9 and 10 show enqueue and dequeue charts. The Enqueue and Dequeue charts are generic to producer/consumer queues, and are applied to both the Request and the Response queues.

As shown in FIG. 8, in operation, the client fills out a request data structure (see FIG. 5) and, if necessary, an array of SGL entry data structures 800. The client enqueues the request on the virtual storage device request ring 810 and increases the request ring producer index 400.

The server polls the virtual storage device request ring index registers 820 to look to determine whether the request ring producer index exceeds the request ring consumer index. If so, the server copies the request strucuture into its own allocated memory and translates the client's address space into the host OS physical memory space (830). Once the request has been copied, the request ring consumer index 410 will be incremented.

When the server is able to process the request, it will dequeue the request 840 and process the request 850. The server is able to process requests in any order to maximize efficiency of the server. Once completed, the server will fill out a completion data structure (See FIG. 6) and post the data structure to the client's completion ring 860. The server will also increment the completion ring producer index 420. The client will act on the response results and dequeue the completion structure from the completion ring 870. Once the result has been dequeued by the client, the completion ring consumer index 430 will be incremented.

FIGS. 9 and 10 show example processes of how data structures may be enqueued and dequeued from the ring. In FIGS. 9 and 10, the server and the client can each be both producers and consumers. When a producer (P) is looking to enqueue a data structure to one of the rings, the producer will first determine if the ring is full. Specifically, if the value of the producer index plus 1 equals the value of the consumer index 910, then all of the values in the ring are currently being used and the ring is full 920. If this condition is not met, there is at least one open memory location and the data may be put into the ring 930. The producer index is then incremented 940 and the process ends.

Likewise when a consumer (C) is looking to dequeue a data structure from one of the rings, the consumer will look to determine if the value of the producer index is the same as the value of the consumer index 1010. If so, the ring is empty 1020 since all entries provided by a producer have been consumed by the consumer. If not, there is data on the ring for the consumer and, accordingly, the consumer can take data from the ring 1030. The consumer index will then be incremented 1040 and the process ends.

The methods described herein may be implemented as software configured to be executed in control logic such as contained in a CPU of an electronic device such as a computer. In particular, the functions described herein may be implemented as sets of program instructions implemented utilizing programming techniques known to those of ordinary skill in the art that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling access to physical storage on a network storage system, the method comprising the steps of:
    implementing a virtual hardware environment by a container thread executing on the network storage system;
    running a guest operating system in the virtual hardware environment;
    registering, by the guest operating system, a virtual storage device in the virtual hardware environment; and
    writing data to or reading data from the virtual storage device by the guest operating system to enable access to the physical storage on the network storage system without resorting to the container thread.

2. The method of claim 1, wherein the guest operating system registers the virtual storage device using PCI and the virtual storage device is a form of PCI Host Bus Adapter.

3. The method of claim 2, wherein the guest operating system registers parameters of the virtual storage device as part of a PCI initialization process.

4. The method of claim 1, wherein the step of registering the virtual storage device in the virtual hardware environment enables the guest OS to specify a virtual memory space to be associated with the virtual storage device.

5. The method of claim 4, wherein the guest operating system writes to the virtual storage device in the virtual memory space.

6. The method of claim 5, further comprising the step of mapping between the virtual memory space to a physical memory space associated with the physical storage on the network storage system.

7. The method of claim 1, wherein the step of writing data to or reading data from the virtual storage device comprises the steps of:
- enqueueing a request data structure on a request ring of the virtual storage device;
- incrementing a request ring producer index to reflect the addition of the request data structure to the request ring;
- comparing the request ring producer index with a request ring consumer index to detect the addition of the request data structure to the request ring;
- copying the request data structure from the request ring to physical memory; and
- incrementing the request ring consumer index after the step of copying the request data structure to physical memory.

8. The method of claim 7, wherein the step of writing data to or reading data from the virtual storage device further comprises the steps of:
- enqueueing a completion data structure on a completion ring;
- incrementing a completion ring producer index to reflect the addition of the completion data structure to the completion ring;
- comparing the completion ring producer index with a completion ring consumer index to detect the addition of the completion data structure to the completion ring;
- copying the completion data structure from the completion ring; and
- incrementing the completion ring consumer index after the step of copying the completion data structure from the completion ring.

9. The method of claim 8, wherein the request data structure has an identifier, and wherein the completion data structure contains the identifier to allow the request data structure to be matched to the completion data structure.

10. A network storage system, comprising:
- hardware;
- physical storage;
- a host operating system and system software controlling operation of the hardware;
- a container running as a thread in the host operating system and providing a virtual hardware environment;
- a guest operating system running in the context of the virtual hardware environment; and
- a virtual storage device, defined in the virtual hardware environment, usable by the guest operating system to post storage requests;
- a mapping function, running in the context of the container, to retrieve posted storage requests, map the posted storage requests, and respond to posted storage requests;
- wherein the guest operating system is configured to write data to or read data from the virtual storage device to enable access to the physical storage on the network storage system without resorting to the container thread.

11. The network storage system of claim 10, wherein the mapping function is implemented as a client driver interfacing the guest operating system and a server driver interfacing the container.

12. The network storage system of claim 10, wherein the virtual storage device is defined by the guest OS as a PCI HBA containing queue structures in memory accessible by both the container thread and the guest OS.

13. The network storage system of claim 12, wherein the queue structures include a request ring, a completion ring, and a plurality of indexes enabling the existence of requests and completions on the request ring and completion ring to be determined by the guest OS and container thread.

14. The network storage system of claim 10, wherein the virtual storage device is a driver, implemented as a client driver at the Guest OS and a server driver at the container thread, the client driver being configured to transform requests from applications running in the context of the guest operating system to a format for entry to the virtual storage device.

15. The network storage system of claim 14, wherein the virtual storage device is implemented using a plurality of registers in host physical memory, and wherein the guest OS specifies locations within the registers using a guest physical address space.

16. The network storage system of claim 15, wherein the mapping function translates the locations specified in the guest physical address space to locations in host physical address space.

17. The network storage system of claim 15, wherein the registers are established during a BIOS phase of guest OS initialization sequence.

18. The network storage system of claim 17, wherein the guest OS configures the registers by specifying a PCI device through which the guest OS may write and read data.

19. The network storage system of claim 10, wherein the storage requests are for access to physical storage implemented on the hardware.

20. The network storage system of claim 10, wherein the storage requests are for access to a second guest OS.

* * * * *